United States Patent [19]

van Broekhoven et al.

[11] Patent Number: 4,824,934

[45] Date of Patent: Apr. 25, 1989

[54] PROCESS FOR POLYMERIZING CARBON MONOXIDE WITH A QUINONE

[75] Inventors: Johannes A. M. van Broekhoven; Eit Drent, both of Amsterdam, Netherlands

[73] Assignee: Shell Oil Company, Houston, Tex.

[21] Appl. No.: 21,948

[22] Filed: Mar. 5, 1987

[30] Foreign Application Priority Data

Mar. 5, 1986 [NL] Netherlands .................. 8600564

[51] Int. Cl.$^4$ ............................................. C08G 67/02
[52] U.S. Cl. ..................................... 528/392; 502/154
[58] Field of Search ......................................... 528/392

[56] References Cited

U.S. PATENT DOCUMENTS

| | | | |
|---|---|---|---|
| 2,495,286 | 1/1950 | Brubaker | 260/63 |
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 3,780,140 | 12/1973 | Hammer | 525/185 |
| 3,835,123 | 9/1974 | Nozaki | 260/94.9 |
| 3,914,391 | 10/1975 | Nozaki | 423/364 |
| 3,984,388 | 10/1976 | Shryne | 260/63 |
| 4,070,532 | 1/1978 | Hammer | 526/11.2 |
| 4,076,911 | 2/1978 | Fenton | 526/11.1 |
| 4,414,409 | 11/1983 | Waller | 560/233 |
| 4,424,317 | 1/1984 | Serres | 525/539 |
| 4,474,978 | 10/1984 | Drent | 560/24 |
| 4,599,476 | 7/1986 | Drent | 585/511 |
| 4,600,614 | 7/1986 | Lancaster et al. | 428/35 |
| 4,634,793 | 1/1987 | Drent | 560/243 |

FOREIGN PATENT DOCUMENTS

| | | |
|---|---|---|
| 121965 | 8/1984 | European Pat. Off. . |
| 0181014 | 5/1986 | European Pat. Off. . |
| 2046968 | 10/1964 | Japan . |
| 74048406 | 3/1969 | Japan . |
| 1081304 | 3/1965 | United Kingdom . |
| 2058074 | 8/1979 | United Kingdom . |

OTHER PUBLICATIONS

Kirk-Othmer Encyclopedia of Chemical Technology, Second Edition, vol. 12, p. 132, 1967.
Encyclopedia of Polymer Science and Technology, 1968, vol. 9, 397–402.
J. Am. Chem. Soc. 1982, 104, 32520-2.
*Tetrahedron Lett.* 1971, 26, 2409–2412.
Organometallics 1984, 3, 866–870.
Proc. Ind. Assoc. Cult. Sci. 1985, 68B, 1–5.
Chemtech 1986, 1, 48–51.
Adv. Polym. Sci. 1986, 73-4, 125–44.
J. Organomet. Chem. 1985, 279, C5–C10.
Polym. Lett. 1965, 3, 703–7.
Chim. Ind. 1971, 53, 939–40.
J. Mol. Catal. 1983, 18, 117–25.

*Primary Examiner*—Harold D. Anderson

[57] ABSTRACT

The invention relates to compositions that may be used as catalysts for the preparation of polymers of carbon monoxide and at least one olefinically unsaturated organic compound. The invention also relates to a process using the catalyst compositions of the invention to prepare said polymers. The process comprises contacting the monomers in the presence of a catalyst obtained from the reaction of (a) a Group VIII metal compound with (b) a bidentate phosphorus, arsenic or antimony ligand, (c) a compound selected from the group consisting of non-noble transition metal salts having an anion of a non-hydrohalogenic acid with a pKa less than 6, and (d) a quinone.

47 Claims, No Drawings

PROCESS FOR POLYMERIZING CARBON MONOXIDE WITH A QUINONE

FIELD OF THE INVENTION

The invention relates to a process for the preparation of polymers of carbon monoxide and at least one olefinically unsaturated organic compound. The invention also relates to the catalyst compositions used in the process of the invention to prepare said polymers.

BACKGROUND OF THE INVENTION

Polymers of carbon monoxide and olefins, such as ethylene, have been known and available for limited quantities for many years. For example, polyketones are disclosed in Kirk-Othmer Encyclopedia of Chemical Technology, Second Edition, Vol. 12, p. 132, 1967, and in Encyclopedia of Polymeric Science and Technology, 1968, Vol. 9, 397–402. it is known that polyketones may be prepared by contacting CO and ethylene monomers in the presence of a catalyst. High molecular weight polymers of ethylene which contain small quantities of carbon monoxide can be prepared with the aid of Ziegler catalysts. Low molecular weight polymers of carbon monoxide with ethylene and possibly other olefinically unsaturated hydrocarbons in which all monomer units occur distributed at random within the polymer can be prepared with the aid of radical catalysts such as peroxides. A special class of the polymers of carbon monoxide with ethylene is formed by the high molecular weight linear polymers in which the monomer units occur in alternating order and which polymer consist of units with the formula $-CO-(C_2H_4)-$. Such polymers can be prepared with the aid of, among others, phosphorus-, arsenic-, antimony-, or cyanogen-containing compounds of palladium, cobalt or nickel as catalysts.

High molecular weight linear alternating polymers of carbon monoxide and ethylene consisting of units of the formula $-CO-(C_2H_4)-$, can also be prepared by using catalyst compositions comprising:

(a) a compound of a Group VIII metal selected from the group consisting of palladium, cobalt and nickel, (b) a non-hydrohalogenic acid having a pKa less than 6, and (c) a bidentate ligand of the general formula

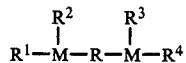

wherein M represents phosphorus, arsenic or antimony, R is a bivalent organic bridging group which contains at least two carbon atoms in the bridge and $R^1$, $R^2$, $R^3$ and $R^4$ represent hydrogen groups.

Application of these catalyst compositions to a monomer mixture which, in addition to carbon monoxide, comprises for example ethylene and one or more alkenically unsaturated hydrocarbons having the general formula $C_xH_y$ leads to the formation of polymers with units of the formula $-CO-(C_2H_4)-$ and units of the general formula $-CO-(C_xH_y)-$ occurring randomly distributed throughout the polymer chains. The structures of the copolymers and 'terpolymers' differ only in that in the case of the 'terpolymers' a group $-(C_xH_y)-$ is encountered at random places in the polymer instead of a $-(C_2H_4)-$ group.

SUMMARY OF THE INVENTION

It has now been found that when the acid mentioned as component (b) is replaced by a non-noble transition metal salt of the relevant acid, catalyst compositions are obtained which possess an attractive activity for the polymerization of carbon monoxide with one or more olefinically unsaturated organic compounds. The activity is in some cases even considerably better than that of the corresponding catalyst compositions based on the acid. Even partial replacement of the acid by the salt will in these cases result in a gain in activity. It has also been found that the activity of the catalyst compositions based on a salt or a mixture of a salt and an acid as component (b) can in some cases be much improved by incorporating a quinone into these compositions. These novel catalyst compositions were used to prepare:

(1) copolymers of carbon monoxide with octene-1, and (2) terpolymers of carbon monoxide with ethene and with dodecene-1.

The patent application therefore relates to a process for the preparation of polymers of carbon monoxide with at least one olefinically unsaturated hydrocarbon which process comprises contacting carbon monoxide and a least one olefinically unsaturated organic compound in the presence of a catalyst obtained by reacting (1) a compound of a Group VIII metal selected from the group consisting of palladium, cobalt and nickel, (2) a compound selected from the group consisting of non-noble transition metal salts having an anion of a non-hydrohalogenic acid with a pKa less than 6, a mixture of said salts, and a mixture of said salt and a non-hydrohalogenic acid with a pKa less than 6, (3) a bidentate ligand of the general formula

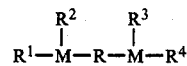

wherein M is selected from the group consisting of phosphorus, arsenic or antimony, R is a bivalent organic bridging group containing at least two carbon atoms in the bridge, $R^1$, $R^2$, $R^3$ and $R^4$ are substituted or unsubstituted hydrocarbon groups, and (4) a quinone, and under conditions suitable to prepare a linear alternating polymer.

The patent application further relates to catalyst compositions comprising:

(a) a compound of a Group VIII metal selected from the group consisting of palladium, cobalt and nickel, (b) a compound selected from the group consisting of non-noble transition metal salts having an anion of a non-hydrohalogenic acid with a pKa less than 6, a mixture of said salts, and a mixture of said salts and a non-hydrohalogenic acid with a pKa less than 6, (c) a bidentate ligand of the general formula

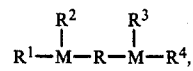

wherein M is selected from the group consisting of phosphorus, arsenic or antimony, R represents a bivalent organic bridging group having at least two carbon atoms in the bridge, $R^1$, $R^2$, $R^3$ and $R^4$ represent substituted or unsubstituted hydrocarbon groups, and (d) a quinone.

The patent application further relates to the polymers prepared in the process of the invention and to shaped objects which consist at least partly of these polymers.

DETAILED DESCRIPTION OF THE INVENTION

The preferred Group VIII metal compound present in the catalyst composition is a palladium compound. Very suitable are palladium salts of carboxylic acids and in particular palladium acetate. Examples of suitable acids with a pKa less than 6 (determined in aqueous solution at 18° C.) are sulfonic acid, perchloric acid, sulfonic acidd, such as methanesulfonic acid, trifluoromethanesulfonic acid and para-toluenesulfonic acid and carboxylic acids, such as trichloroacetic acid, difluoroacetic acid, trifluoroacetic acid. Preferred are all acids with a pKa less than 4, acids with a pKa less than 2 are even more preferred. The most preference is given to para-toluenesulfonic acid and trifluoroacetic acid. The preferred quantity of the non-noble transition metal salt of an acid with a pKa less than 6, or mixture of non-noble transition metal salt and acid having a pKa less than 6, present in the catalyst compositions is from 0.5 to 200, and more preferred from 1.0 to 100 equivalents per gram atom of Group VIII metal. If an acid is used in addition to a salt, preference is given to compositions in which the ratio between the number of equivalents of salt and the number of equivalents of acid is higher than 1.

In the present patent application non-noble transition metals means all the transition metals including the actinides and lanthanides, but with the exclusion of the noble metals ruthenium, osmium, rhodium, iridium, palladium, platinum, silver and gold. Examples of transition metals whose salts are very suitable for use as component (b) in the catalyst compositions according to the invention are the Group 4B metals titanium, zirconium and hafnium, the Group 5B metals vanadium, niobium and tantalum, the Group 6B metals chromium, molybdenum and tungsten, the Group 7B metal manganese, the Group 8 metals iron, cobalt and nickel, the Group 1B metal copper, the Group 2B metal zinc, the lanthanides cerium, lanthanum, praseodymium samarium, dysprosium, erbium and lutecium and the actinides actinium, thorium and uranium.

Special preference is given to the use of salts of the following transition metals: the Group 4B metal zirconium, the Group 5B metal vanadium, the Group 6B metal chromium, the Group 8 metals iron and nickel, the Group 1B metal copper, the lanthanide cerium and the actinides thorium and uranium.

In the bidentate ligand M is preferably phosphorus. The preferred quantity of bidentate ligand present in the catalyst composition is from 0.5–5 and more preferred from 0.5–1.5 mol per mol of Group VIII metal compound. The bivalent organic bridging group R preferably contains three carbon atoms in the bridge. The groups $R^1$, $R^2$, $R^3$ and $R^4$ present in the bidentate ligand each preferably contain 6 to 14 carbon atoms. Especially preferred are bidentate ligands in which each one of the groups $R^1$, $R^2$, $R^3$ and $R^4$ contains an aryl group or an alkyl-substituted aryl group which is directly linked to the M atom. More preferred are phenyl groups or alkyl-substituted phenyl groups. $R^1$, $R^2$, $R^3$ and $R^4$ may also be substituted with polar groups. Examples of suitable bidentate ligands are:
1,3-bis(di-p-tolylphosphino)propane,
1,3-bis(di-p-methoxyphenylphosphino)propane,
1,3-bis(diphenylphoshino)propane, and
2-methyl-2-(methyldiphenylphosphino)-1,3-bis(diphenylphosphino)propane.

Preferably either one of the latter two bidentate ligands is used.

As the component (d) either 1,2- or 1,4-quinones may be used. Preference is given to 1,4-quinones. Besides substituted or unsubstituted benzoquinones, other quinones, such as substituted or unsubstituted naphthaquinones and anthraquinones, are also eligible. Preference is given to benzoquinones and to 1,4-benzoquinones in particular. Examples of suitable compounds of this type are:
2,6-dichloro-1,4-benzoquinone,
tetrachloro-1,4-benzoquinone,
2,3-dimethyl-1,4-benzoquinone,
mono-methyl-1,4-benzoquinone,
trichloro-1,4-benzoquinone,
2,5-dihydroxy-1,4-benzoquinone,
2,5-dihydroxy-3,6-dinitro-1,4-benzoquinone, and
mono-nitro-1,4-benzoquinone.

The preferred component (d) is 1,4-benzoquinone. The preferred quantity of compound (d) used is 1–10000 and more preferably 10–5000 mol per gram atom of Group VIII metal.

Eligible olefinically unsaturated organic compounds that can be polymerized with carbon monoxide with the aid of the catalyst compositions according to the invention are both compounds which consist exclusively of carbon and hydrogen and compounds which, in addition to carbon and hydrogen, contain one or more hetero-atoms. By preference the catalyst compositions according to the invention are used to prepare polymers of carbon monoxide with one or more olefinically unsaturated hydrocarbons. Examples of suitable hydrocarbon monomers are ethylene and other α-olefins, such as propylene, butene-1, hexene-1 and octene-1 as well as styrene and alkyl-substituted styrenes, such as p-methyl styrene and p-ethyl styrene. The catalyst compositions according to the invention are especially suitable for use in the preparation of copolymers of carbon monoxide with ethylene and in the preparation of terpolymers of carbon monoxide with ethylene and with an other olefinically unsaturated hydrocarbon, in particular propylene.

The polymerization using the catalyst compositions according to the invention is preferably carried out in a liquid diluent. Very suitable liquid diluents are lower alcohols, such as methanol and ethanol. The quantities of catalyst composition used in the preparation of the polymers may vary within wide limits. Per mol of olefinically unsaturated hydrocarbon to be polymerized, a quantity of catalyst composition is used which preferably contains $10^{-7}$–$10^{-3}$ and more preferably $10^{-6}$–$10^{-4}$ gram atom of Group VIII metal. The preparation of the polymers by using the catalyst compositions according to the invention is preferably carried out at a temperature of 20°–200° C. and a pressure of 1–200 bar and more preferably at a temperature of 30°–150° C. and a pressure of 20–100 bar.

In the mixture to be polymerized the molar ration of the olefinically unsaturated organic compounds relative to carbon monoxide preferably is 10:1–1:5 and in particular 5:1–1:2. The carbon monoxide used in the preparation of the polymers according to the invention need not be pure. It may contain contaminations, such as hydrogen, carbon dioxide and nitrogen.

The polymers according to the invention have good mechanical properties. They can be processed by means of the usual techniques into, among other things, films, sheets, plates, fibers and molded objects. The low molecular weight polymers in particular may be used as intermediates for the production of plastics, as components in blends with other polymers (such as waxes and greases) and as plasticizers for other polymers. The higher molecular weight polymers have use and utility as premium thermoplastics for fibers, films, injection molding, compression molding or blowing applications. On account of their properties, the higher molecular weight polymers according to the invention are suitable for many applications, such as in the auto industry, for the manufacture of packaging material for the foods and drinks, as constructional and building material, for the manufacture of cables and for a variety of applications in the domestic sphere. In order to modify the characteristics or to strengthen them, the polymers according to the invention can be employed in combination with many other sorts of materials.

The invention will now be illustrated with the aid of the following examples.

EXAMPLE 1

A carbon monoxide/ethylene copolymer was prepared as follows. A magnetically stirred autoclave of 250 ml capacity was charged with a catalyst solution consisting of:
50 ml of methanol
0.1 mmol of palladium acetate,
0.15 mmol 1,3-bis(diphenylphosphino)propane, and
2 mmol p-toluenesulfonic acid.
Carbon monoxide was introduced into the autoclave until a pressure of 30 bar was reached, and then ethylene until a pressure of 60 bar was reached. Finally, the autoclave was heated to 50° C. After two hours the polymerization was terminated by cooling down to room temperature and then releasing the pressure. The polymer was filtered off, washed with methanol and dried in vacuo at room temperature. The yield was 10 g of copolymer, so the polymerization rate was 500 g of copolymer/g of palladium/hour.

EXAMPLE 2

A carbon monoxide/ethylene copolymer was prepared in substantially the same manner as the copolymer in Example 1, the differences being that:
(a) the catalyst solution contained 2 mmol of copper para-tosylate instead of 2 mmol of para-toluenesulfonic acid and
(b) the reaction time was 1.5 hour.
The yield was 15 g of compolymer, so the polymerization rate was 1000 g of copolymer/g of palladium/hour.

EXAMPLE 3

A carbon monoxide/ethylene copolymer was prepared in substantially the same manner as the copolymer in Example 2, the differences being that
(a) the catalyst solution in addition contained 10 mmol of 1,4-benzoquinone and
(b) the reaction time was ¾ hour.
The yield was 15 g of copolymer, so the polymerization rate was 2000 g of copolymer/g of palladium/hour.

EXAMPLE 4

A carbon monoxide/ethylene copolymer was prepared in substantially the same manner as the copolymer in Example 3, the differences being that
(a) the reaction temperature was 20° C. and
(b) the reaction time was 1 hour.
The yield was 5 g of copolymer, so the polymerization rate was 500 g of copolymer/g of palladium/hour.

EXAMPLE 5

A carbon monoxide/ethylene copolymer was prepared in substantially the same manner as the copolymer in Example 1, the differences being that
(a) the catalyst solution contained 2 mmol of copper perchlorate instead of 2 mmol of p-toluenesulfonic acid and
(b) the reaction time was 1.5 hour.
The yield was 12 g of copolymer, so the polymerization rate was 800 g of copolymer/g of palladium/hour.

EXAMPLE 6

A carbon monoxide/ethylene copolymer was prepared in substantially the same manner as the copolymer in Example 1, the differences being that
(a) the catalyst solution contained 2 mmol of nickel perchlorate instead of 2 mmol p-toluenesulfonic acid,
(b) the reaction temperature was 55° C. and
(c) the reaction time was 1 hour.
The yield was 13 g of copolymer, so the polymerization rate was 1300 g of copolymer/g of palladium/hour.

EXAMPLE 7

A carbon monoxide/ethylene copolymer was prepared in substantially the same manner as the copolymer in Example 1, the differences being that
(a) the catalyst solution contained 0.5 mmol of chromium sulfate instead of 2 mmol of p-toluenesulfonic acid,
(b) the reaction temperature was 55° C. and
(c) the reaction time was 1 hour.
The yield was 10.5 g of copolymer, so the polymerization rate was 1050 g of copolymer/g of palladium/hour.

EXAMPLE 8

A carbon monoxide/ethylene copolymer was prepared in substantially the same manner as the copolymer in Example 1, the differences being that
(a) the catalyst solution contained 0.5 mmol of iron perchlorate instead of 2 mmol of p-toluenesulfonic acid,
(b) the reaction temperature was 55° C. and
(c) the reaction time was 1.5 hour.
The yield was 13.5 g of copolymer, so the polymerization rate was 900 g of copolymer/g of palladium/hour.

EXAMPLE 9

A carbon monoxide/ethylene copolymer was prepared in substantially the same manner as the copolymer in Example 1, the differences being that
(a) the catalyst solution contained 0.5 mmol of vanadyl sulfate instead of 2 mmol of p-toluenesulfonic acid, and
(b) the reaction temperature was 70° C.
The yield was 14 g of copolymer, so the polymerization rate was 700 g of copolymer/g of palladium/hour.

EXAMPLE 10

A carbon monoxide/ethylene copolymer was prepared in substantially the same manner as the copolymer in Example 9, except that now the catalyst solution in addition contained 2 mmol of tetramethyl-1,4-benzoquinone.

The yield was 17 g of copolymer, so the polymerization rate was 850 g of copolymer/g of palladium/hour.

EXAMPLE 11

A carbon monoxide/ethylene copolymer was prepared in substantially the same manner as the copolymer in Example 1, the differences being that
(a) the catalyst solution contained 0.5 mmol of zirconium sulfate instead of 2 mmol of p-toluenesulfonic acid and
(b) the reaction time was 2.5 hours.

The yield was 20 g of copolymer, so the polymerization rate was 800 g of copolymer/g of palladium/hour.

EXAMPLE 12

A carbon monoxide/ethylene copolymer was prepared in substantially the same manner as the copolymer in Example 1, the differences being that
(a) the catalyst solution contained 0.5 mmol of uranyl sulfate instead of 2 mmol of p-toluenesulfonic acid,
(b) the reaction temperature was 80° C. and
(c) the reaction time was 2.5 hours.

The yield was 20 g of copolymer, so the polymerization rate was 800 g of copolymers/g of palladium/hour.

EXAMPLE 13

A carbon monoxide/ethylene copolymer was prepared in substantially the same manner as the copolymer in Example 12, the differences being that
(a) the catalyst solution in addition contained 2 mmol of 1,4-benzoquinone,
(b) the reaction temperature was 70° C. and
(c) the reaction time was 2 hours.

The yield was 20 g of copolymer, so the polymerization rate was 1000 g of copolymer/g of palladium/hour.

EXAMPLE 14

A carbon monoxide/ethylene copolymer was prepared in substantially the same manner as the copolymer in Example 1, the differences being that
(a) the catalyst solution contained 0.5 mmol of cerium sulfate instead of 2 mmol of p-toluenesulfonic acid and
(b) the reaction time was 2.5 hours.

The yield was 20 g of copolymer, so the polymerization rate was 800 g of copolymer/g of palladium/hour.

EXAMPLE 15

A carbon monoxide/propylene copolymer was prepared as follows.

A magnetically stirred autoclave of 250 ml capacity was charged with catalyst solution consisting of:
50 ml of methanol,
0.1 mmol of palladium acetate,
0.15 mmol of 1,3-bis(diphenylphosphino)propane and
2 mmol of copper para-tosylate.

30 ml of liquid propylene was introduced into the autoclave, followed by carbon monoxide until a pressure of 40 bar was reached. Finally, the contents of the autoclave was brought to 85° C. After 5 hours the polymerization was terminated and the polymer isolated as indicated in Example 1, except that now the contents of the reactor were cooled down to −20° C. before being filtered off. The yield was 15 g of copolymer, so the polymerization rate was 300 g of copolymer/g of palladium/hour.

EXAMPLE 16

A carbon monoxide/octene-1 copolymer was prepared substantially the same manner as the copolymer in Example 15, the differences being that
(a) 20 ml of octene-1 was introduced into the autoclave instead of 30 ml of propene, and
(b) the reaction temperature was 90° C.

The yield was 6 g of copolymer, so the polymerization rate was 120 g of copolymer/g of palladium/hour.

EXAMPLE 17

A carbon monoxide/ethylene/propene terpolymer was prepared as follows. A mechanically stirred autoclave of 300 ml capacity was charged with 140 ml of methanol and 86 ml of liquid propylene. After the contents of the autoclave had been brought to a temmperature of 65° C., a 1:1 carbon monoxide/ethylene mixture was introduced until a pressure of 55 bar was reached. Then the autoclave was charged with a catalyst solution consisting of:
6 ml of methanol,
0.01 mmol of palladium acetate,
0.012 mmol of 1,3-bis(diphenylphosphino)propane,
0.02 mmol of copper para-tosylate and
0.1 mmol of 1,4-benzoquinone.

Introduction of a 1:1 carbon monoxide/ethylene mixture kept the pressure at 55 bar. After 1 hour the polymerization was terminated by releasing the pressure. The polymer was filtered off, washed with methanol and dried at 70° C. The yield was 5.7 g of terpolymer, so the polymerization rate was 5700 g of terpolymer/g of palladium/hour.

EXAMPLE 18

A carbon monoxide/ethylene/octene-1 terpolymer was prepared in substantially the same manner as the terpolymer in Example 17, the differences being that
(a) instead of 140 ml of methanol, 180 ml of the same compound was used,
(b) instead of 86 ml of propylene, 78 ml of octene-1 was used,
(c) the quantity of catalyst solution was trebled, and
(d) the reaction time was 5 hours.

The yield was 30 g of terpolymer, so the polymerization rate was 2000 g of terpolymer/g of palladium/hour.

EXAMPLE 19

A carbon monoxide/ethylene/dodecene-1 terpolymer was prepared in substantially the same manner as the terpolymer in Example 18, the differences being that
(a) instead of 78 ml of octene-1, 78 ml of dodecene-1 was used and
(b) the reaction time was 3 hours.

The yield was 20 g of terpolymer, so the polymerization rate was 2200 g of terpolymer/g of palladium/hour.

EXAMPLE 20

A carbon monoxide/ethylene/styrene terpolymer was prepared in substantially the same manner as the terpolymer in Example 18, the differences being that
(a) instead of 180 ml of methanol, 140 ml of the same compound was used, (b) instead of 78 ml of octene-1, 63 ml of styrene was used, and (c) the reaction time was 6 hours.

The yield was 22 g of terpolymer, so the polymerization rate was 1200 g of terpolymer/g of palladium/hour.

Of the polymers prepared according to Examples 1-20, the copolymers prepared according to Examples 2-16 and the terpolymers prepared according to Examples 17-20 are polymers according to the invention. In the preparation of these polymers use was made of catalyst compositions according to the invention containing a salt of a non-stable transition metal. The catalyst compositions according to the invention used in the Examples 3, 4, 10, 13 and 17-20 in addition contained a quinone as the fourth component. The copolymer prepared according to Example 1 falls outside the scope of the invention and has been included in the patent application for comparison.

The favorable effect which the replacement of an acid in the catalyst compositions by a non-noble transition metal of the acid has on the polymerization rate becomes evident upon comparison of the results of Examples 1 and 2.

The favorable effect which the incorporation into the catalyst compositions according to the invention of a quinone as the fourth component has on the polymerization rate becomes evident upon comparison of the results of Examples 2, 9 and 12 with those of Examples 3, 10 and 13, respectively.

All of the copolymers prepared according to Examples 1-14 had melting points of 257° C. The terpolymers prepared according to Examples 17-20 had melting points of 183°, 220°, 235° and 225° C., respectively.

With the aid of $^{13}$C-NMR analysis it was established that the carbon mnoxide/ethylene copolymers prepared according to Examples 1-14, the carbon monoxide/propylene copolymer prepared according to Example 15 and the carbon monoxide/octene-1 copolymer prepared according to Example 16 had a linear alternating structure and therefore consisted of units of the formulae —CO—(C$_2$H$_4$)—, —CO—(C$_3$H$_6$)— and —CO—(C$_8$H$_{16}$)—, respectively.

It was also established by $^{13}$C-NMR analysis that the carbon monoxide/ethylene/propylene terpolymer, the carbon monoxide/ethylene/octene-1 terpolymer, the carbon monoxide/ethylene/dodecene-1 terpolymer and the carbon monoxide/ethylene/styrene terpolymer prepared according to Examples 17, 18, 19 and 20, respectively, had a linear structure and consisted of units of the formula —CO—(C$_2$H$_4$)— with in addition units of the formula —CO—(C$_3$H$_6$)—, —CO—(C$_8$H$_{16}$)—, —CO—(C$_{12}$H$_{24}$)— and —CO—(C$_8$H$_9$)—, respectively, which units occured randomly distributed within the terpolymers. The data produced by $^{13}$C-NMR analysis showed that the terpolymers were composed as follows.

In the terpolymer prepared according to Example 17 there were 21 units based on propylene to 79 units based on ethylene, which amounts to a propylene content in the terpolymer of 12.4%w.

In the terpolymer prepared according to Example 18 there were 75 units based on octene-1 to 925 units based on ethene, which amounts to an octene-1 content in the terpolymer of 12.6%w.

In the terpolymer prepared according to Example 19 there were 42 units based on dodecene-1 to 958 units based on ethene, which amounts to a dodecene-1 content in the terpolymer of 11%w.

In the terpolymer prepared according to Example 20 there were 33 units based on styrene to 967 units based on ethene, which amounts to a styrene content in the terpolymer of 5.7%w.

What is claimed is:

1. A process for preparing a linear alternating polymer which process comprises contacting carbon monoxide and at least one olefinically unsaturated organic compound in the presence of a catalyst wherein the catalyst is obtained by reacting (1) a compound of a Group VIII metal selected from the group consisting of palladium, cobalt and nickel, (2) at least one salt of a metal selected from the group of metals consisting of Group 1B-7B, iron, cobalt, nickel, actinides, and lanthanides, having an anion of a non-hydrohalogenic acid with a pKa less than 6 (3) a bidentate ligand of the general formula

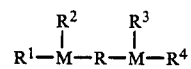

wherein M is selected from the group consisting of phosphorus, arsenic or antimony, R is a bivalent organic bridging group containing at least two carbon atoms in the bridge and $R^1$, $R^2$, $R^3$ and $R^4$ are substituted or unsubstituted hydrocarbon groups, and (4) a quinone, and under conditions suitable for preparing a linear alternating polymer.

2. The process of claim 1 wherein the Group VIII metal compound is a palladium compound.

3. The process of claim 1 wherein the Group VIII metal compound is a palladium salt of a carboxylic acid.

4. The process of claim 1 wherein the Group VIII metal compound is palladium acetate.

5. The process of claim 1 wherein the non-hydrohalogenic acid with a pKa less than 6 is an acid selected from the group consisting of sulfonic acids with a pKa of less than 2 and carboxylic acids with a pKa of less than 2.

6. The process of claim 1 wherein the non-hydrohalogenic acid with a pKa less than 6 is an acid selected from the group consisting of para-toluenesulfonic acid and trifluoroacetic acid.

7. The process of claim 1 wherein the salt of a metal is selected from the group of metals consisting of zirconium, vanadium, chromium, iron, nickel, copper, cerium, thorium, and uranium.

8. The process of claim 1 wherein the salt of a metal comprises a mixture of metal salt having an anion of a non-hydrohalogenic acid with a pKa less than 6 and non-hydrohalogenic acid with a pKa less than 6.

9. The process of claim 8 wherein in the mixture of metal salt and a non-hydrohalogenic acid with a pKa less than 6, the ratio between the number of equivalents of salt and the number of equivalents of acid is greater than 1.

10. The process of claim 1 wherein in the reaction to obtain the catalyst, component (2) quantity is from about 0.5 to about 200 equivalents of the aniono of a non-hydrohalogenic acid with a pKa less than 6 per gram atom of Group VIII metal.

11. The process of claim 1 wherein the reaction to obtain the catalyst, component (2) quantity is from about 1.0 to about 100 equivalents of the anion of a non-hydrohalogenic acid with a pKa less than 6 per gram atom of Group VIII metal.

12. The process of claim 1 wherein M is phosphorus.

13. The process of claim 1 wherein in the reaction to obtain the catalyst, quantity of bidentate ligand is from about 0.1 to about 5.0 mol per mol of Group VIII metal compound.

14. The process of claim 1 wherein in the reaction to obtain the catalyst, quantity of bidentate ligand is from about 0.5 to about 1.5 mol per mol of Group VIII metal compound.

15. The process of claim 1 wherein the divalent organic bridging group R contains three carbon atoms in the bridge.

16. The process of claim 1 wherein the hydrocarbon groups $R^1$, $R^2$, $R^3$, and $R^4$ each contain 6 to 14 carbon atoms.

17. The process of claim 1 wherein the hydrocarbon groups $R^1$, $R^2$, $R^3$, and $R^4$ each contain an aryl group bonded directly to M.

18. The process of claim 1 wherein the hydrocarbon groups $R^1$, $R^2$, $R^3$, and $R^4$ are selected from the group consisting of phenyl groups and alkyl-substituted henyl groups.

19. The process of claim 1 wherein the bidentate ligand is selected from the group consisting of 1,3-bis(diphenylphosphino)propane, and 2-methyl-2-(methyldiphenylphosphino)-1,3-bis(diphenylphosphino)propane.

20. The process of claim 1 wherein the process is carried out by contacting the monomers with a catalyst in the presence of a liquid diluting agent.

21. The process of claim 20 wherein the liquid diluting agent is a lower alcohol.

22. The process of claim 20 wherein the liquid diluting agent is methanol.

23. The process of claim 1 wherein quantity of catalyst is from about $10^{-7}$ to about $10^{-3}$ gram atom of Group VIII metal per mol of olefinically unsaturated organic compound.

24. The process of claim 1 wherein quantity of catalyst is from about $10^{-6}$ to about $10^{-4}$ gram atom of Group VIII metal per mol of olefinically unsaturated organic compound.

25. The process of claim 1 wherein the molar ratio of the number of moles of olefinically unsaturated organic compound relative to the number of moles of carbon monoxide is from about 10:1 to about 1:5.

26. The process of claim 1 wherein the molar ratio of the number of moles of olefinically unsaturated organic compound relative to the number of mols of carbon monoxide is from about 5:1 to about 1:2.

27. The process of claim 1 wherein contacting temperature is from about 20° to about 200° C. and contacting pressure is from about 1 to about 200 bar.

28. The process of claim 1 wherein contacting temperature is from about 30° to about 150° C. and contacting pressure is from about 20 to about 100 bar.

29. The process of claim 1 wherein olefinically unsaturated organic compound is hydrocarbon.

30. The process of claim 1 wherein olefinically unsaturated organic compound is ethylene.

31. The process of claim 1 wherein olefinically unsaturated organic ompound is comprised of ethylene and at least one other olefinically unsaturated hydrocarbon.

32. The process of claim 1 wherein olefinically unsaturated organic compound is comprised of ethylene and propylene.

33. The process of claim 1 wherein the quinone is a 1,4-quinone.

34. The process of claim 1 wherein the quinone is a substituted or unsubstituted benzoquinone.

35. The process of claim 34 wherein the benzoquinine os 1,4-benzoquinone.

36. The process of claim 1 wherein in the reaction to obtain the catalyst, quantity of quinone is from about 1 to about 10000 mol per gram atom of Group VIII metal.

37. The process of claim 1 wherein in the reaction to obtain the catalyst, quantity of quinone is from about 10 to about 5000 mol per gram atom of Group VIII metal.

38. The process of claim 3 wherein the non-hydrohalogenic acid with a pKa less than 6 is an acid selected from the group consisting of sulfonic acids with a pKa of less than 2 and carboxylic acids with a pKa of less than 2.

39. The process of claim 38 wherein M is phosphorus.

40. The process of claim 39 wherein the bivalent organic bridging group R contains three carbon atoms.

41. The process of claim 40 wherein the hydrocarbon groups $R^1$, $R^2$, $R^3$, and $R^4$ each contain an aryl group bonded directly to M.

42. The process of claim 41 wherein the bidentate ligand is selected from the group consisting of 1,3-bis(diphenylphosphino)propane, and 2-methyl-2-(methyldiphenylphosphino)-1,3-bis(diphenylphosphino)propane.

43. The process of claim 41 wherein olefinically unsaturated organic compound is alpha-olefin.

44. The process of claim 43 wherein α-olefin is ethylene.

45. The process of claim 43 wherein α-olefin is ethylene and at least one other α-olefin.

46. The process of claim 43 wherein α-olefin is ethylene and propylene.

47. The process of claim 43 wherein the quinone is a 1,4-quinone.

* * * * *